United States Patent
Tanaka et al.

(10) Patent No.: US 10,255,867 B2
(45) Date of Patent: Apr. 9, 2019

(54) DISPLAY DEVICE

(71) Applicant: Panasonic Liquid Crystal Display Co., Ltd., Hyogo (JP)

(72) Inventors: Katsuji Tanaka, Hyogo (JP); Teruhisa Nakagawa, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 70 days.

(21) Appl. No.: 15/475,181

(22) Filed: Mar. 31, 2017

(65) Prior Publication Data

US 2018/0286340 A1 Oct. 4, 2018

(51) Int. Cl.
| | |
|---|---|
| *G09G 3/36* | (2006.01) |
| *G02F 1/1343* | (2006.01) |
| *G02F 1/1362* | (2006.01) |
| *G02F 1/1345* | (2006.01) |
| *G02F 1/1368* | (2006.01) |

(52) U.S. Cl.
CPC .......... *G09G 3/3614* (2013.01); *G02F 1/1368* (2013.01); *G02F 1/13439* (2013.01); *G02F 1/13458* (2013.01); *G02F 1/134336* (2013.01); *G02F 1/136286* (2013.01); *G09G 3/3677* (2013.01); *G09G 3/3688* (2013.01); *G02F 2201/123* (2013.01); *G09G 2300/023* (2013.01); *G09G 2300/0426* (2013.01); *G09G 2310/0297* (2013.01); *G09G 2310/08* (2013.01); *G09G 2340/0464* (2013.01)

(58) Field of Classification Search
CPC .......... G09G 3/3688; G09G 2310/027; G09G 2310/0267; G09G 2300/0426; G09G 2310/0289; G09G 2340/0464–2340/0485; G09G 3/3648; G09G 3/3614; G09G 2300/0443; G09G 3/36
See application file for complete search history.

(56) References Cited

U.S. PATENT DOCUMENTS

| | | | |
|---|---|---|---|
| 8,451,201 B2 | 5/2013 | Hirata et al. | |
| 2008/0088649 A1* | 4/2008 | Ikeno | G09G 3/3611 345/690 |
| 2011/0096062 A1* | 4/2011 | Gondo | G09G 3/3614 345/212 |
| 2012/0127143 A1* | 5/2012 | Gondo | G09G 3/3648 345/208 |
| 2015/0355514 A1* | 12/2015 | Lin | G02F 1/133602 349/44 |

(Continued)

*Primary Examiner* — Sanjiv D. Patel
(74) *Attorney, Agent, or Firm* — HEA Law PLLC

(57) ABSTRACT

A display device includes a plurality of driving circuits, a plurality of terminals formed in each of the plurality of driving circuits, a plurality of signal lines connected to the plurality of terminals, a plurality of pixel electrodes, each of the plurality of pixel electrodes connected to each of the plurality of signal lines; and a switch configured to change a connection mode between the plurality of terminals and the plurality of signal lines. The plurality of signal lines includes a first line, a second line and a third line arrayed in this order. The plurality of terminals includes a first terminal. The switch, configured to change from a first connection mode to a second connection mode, the first terminal connecting the first line and the second line in the first connection mode, and the first terminal connecting the second line and the third line in the second connection mode.

18 Claims, 14 Drawing Sheets

(56) References Cited

U.S. PATENT DOCUMENTS

2016/0284257 A1* 9/2016 Choi .................... G09G 3/3648
2017/0287429 A1* 10/2017 Kong ................... G09G 3/3607
2017/0345357 A1* 11/2017 Kong ................... G09G 3/2003

* cited by examiner

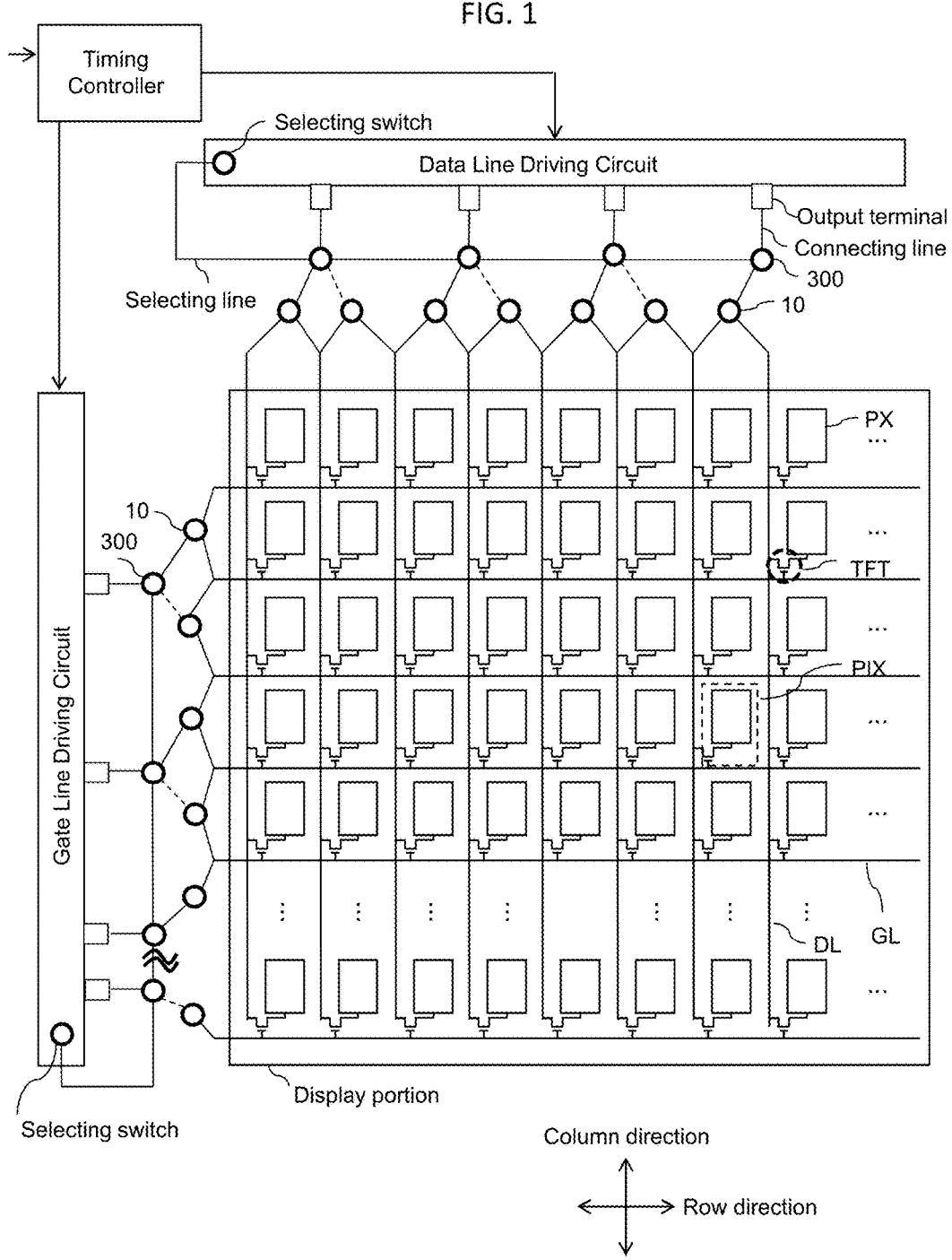

DISPLAY DEVICE

TECHNICAL FIELD

The present disclosure relates to a display device.

BACKGROUND

The present disclosure relates to a display device, and, in particular, to a display device which displays an image. Display devices can display images, and thus are utilized in televisions or monitors, for example.

A display user and a display supplier sometimes desire to shift a location of a display image in a display portion. For example, a display device is proposed in which two display panels are stacked, one on top of another, to allow display of an image having a contrast ratio. In this case, these two panels are stacked such that one pixel in one panel can be strictly positioned to overlap one corresponding pixel in another panel in a plan view. However, it is very difficult to match two display panels without off-setting any pixels.

The present disclosure is made to solve such problems and has an object to provide a display device which can easily shift a display position within a display portion.

SUMMARY

The present disclosure has been made in view of the above circumstances, and an object thereof is to be able to easily shift a display position within a display portion.

In one general aspect, the instance application describes a display device including a plurality of driving circuits, a plurality of terminals formed in each of the plurality of driving circuits, a plurality of signal lines connected to the plurality of terminals, a plurality of pixel electrodes, each of the plurality of pixel electrodes connected to each of the plurality of signal lines; and a switch configured to change a connection mode between the plurality of terminals and the plurality of signal lines. The plurality of signal lines includes a first line, a second line and a third line arrayed in this order. The plurality of terminals includes a first terminal, the switch, configured to change from a first connection mode to a second connection mode, the first terminal connecting the first line and the second line in the first connection mode, and the first terminal connecting the second line and the third line in the second connection mode.

The above general aspect may include one or more of the following features. The plurality of signal lines may further include a fourth line and a fifth line. The first line, the second line, the third line, the fourth line, and the fifth line are arrayed in this order. The plurality of terminals may further includes a second terminal next to the first terminal. In the first connection mode, the second terminal may connects the third line and the fourth line, and in the second connection mode, the second terminal may connect and the fourth line and the fifth line.

The plurality of signal lines may further include a fourth line and a sixth line. The sixth line, the first line, the second line, the third line, and the fourth line are arrayed in this order. The first switch is configured to change connection modes amongst the first connection mode, the second connection mode, or a third connection mode. In the first connection mode, the first terminal may further connects the sixth line, in the second connection mode, the first terminal further may connect the fourth line, and in the third connection mode, the first terminal may connect the first line, the second line and the third line.

The plurality of signal lines may further include a fifth line, a seventh line and an eighth line. The sixth line, the first line, the second line, the third line, the fourth line, the fifth line, the seventh line, and the eighth line, arrayed in this order. The plurality of terminals may further include a second terminal next to the first terminal. In the first connection mode, the second terminal may connect the third line, the fourth line and the fifth line. In the second connection mode, the second terminal may connect the fifth line, the seventh line and the eighth line. In the third connection mode, the second terminal may connect the fourth line, the fifth line and the seventh line.

The display device may further comprise a plurality of thin film transistors (TFT). The plurality of TFTs may include a first TFT and a second TFT. The first and second TFTs are arranged in parallel to one another and having their respective drain lines being commonly connected at the first terminal. In the first connection mode, the first TFT may be turned on and the second TFT is turned off. In the second connection mode, the second TFT may be turned on and the second TFT is turned off.

The display device may further comprise a plurality of thin film transistors (TFT). In the first connection mode, the first terminal connects three lines through four TFTs. Two TFTs from the four TFTs may be turned on and the other two TFTs from the four TFTs may be turned off. In the second connection mode, the other two TFTs are turned on and the two TFTs are turned off.

The display device may further comprise a plurality of thin film transistors (TFT). The first terminal may connect five lines through nine TFTs. In both of the first and second connection modes, three TFTs from the nine TFTs may be turned on and the other six TFTs from the nine TFTs are turned off.

The display device may further comprise a plurality of selecting lines. The plurality of selecting lines may include a first selecting line and a second selecting line. The first selecting line may connect to first gate electrodes of the first TFT and the third TFT, and the second selecting line may connect to second gate electrodes of the second TFT and the fourth TFT. In the first connection mode, the first gate electrodes may be input on-voltage through the first selecting line and the second gate electrodes may be input off-voltage through the first selecting line. In the second connection mode, the second gate electrodes may be input on-voltage through the first selecting line and the first gate electrodes may be input off-voltage through the second selecting line.

The plurality of driving circuits may be data line driving circuits, and the plurality of signal lines may be data lines.

The plurality of driving circuits may be gate line driving circuits, and the plurality of signal lines may be gate lines.

The display device may further comprise a display portion configured to display an image. A plurality of pixel electrodes may be arranged in a matrix in the display portion. A first image may be displayed in the display portion in the first connection mode, and a second image may be displayed in the display portion in the second connection mode. The first image may be shifted from the second image by a pitch of two adjacent signal lines from the plurality of signal lines.

In another general aspect, a display assembly of the instant application includes a first display device and a second display device and a backlight, arranged on top of one another in this order. The second display devices includes a plurality of driving circuits, a plurality of terminals formed in each of the plurality of driving circuits, a plurality of signal lines connected to the plurality of terminals, a plurality of pixel electrodes, each of the plurality of pixel electrodes connected to each of the plurality of signal lines; and a switch configured to change a connection mode between the plurality of terminals and the plurality of signal lines. The plurality of signal lines includes a first line, a second line and a third line arrayed in this order. The plurality of terminals includes a first terminal. The switch, configured to change from a first connection mode to a second connection mode, the first terminal connecting the first line and the second line in the first connection mode, and the first terminal connecting the second line and the third line in the second connection mode.

The above general aspect may include one or more of the following features.

The first display device may display in color, and the second display device may display in monotone.

A pixel may be located in between two adjacent gate lines and two adjacent data lines, and a pixel formed in the display device may be larger than a pixel formed in the first display device.

BRIEF DESCRIPTION OF DRAWINGS

FIG. 1 is a plan view illustrating a schematic configuration of a liquid crystal display device according to an exemplary embodiment;

DETAILED DESCRIPTION OF THE PREFERRED EMBODIMENTS

First Embodiment

Figure 2A:
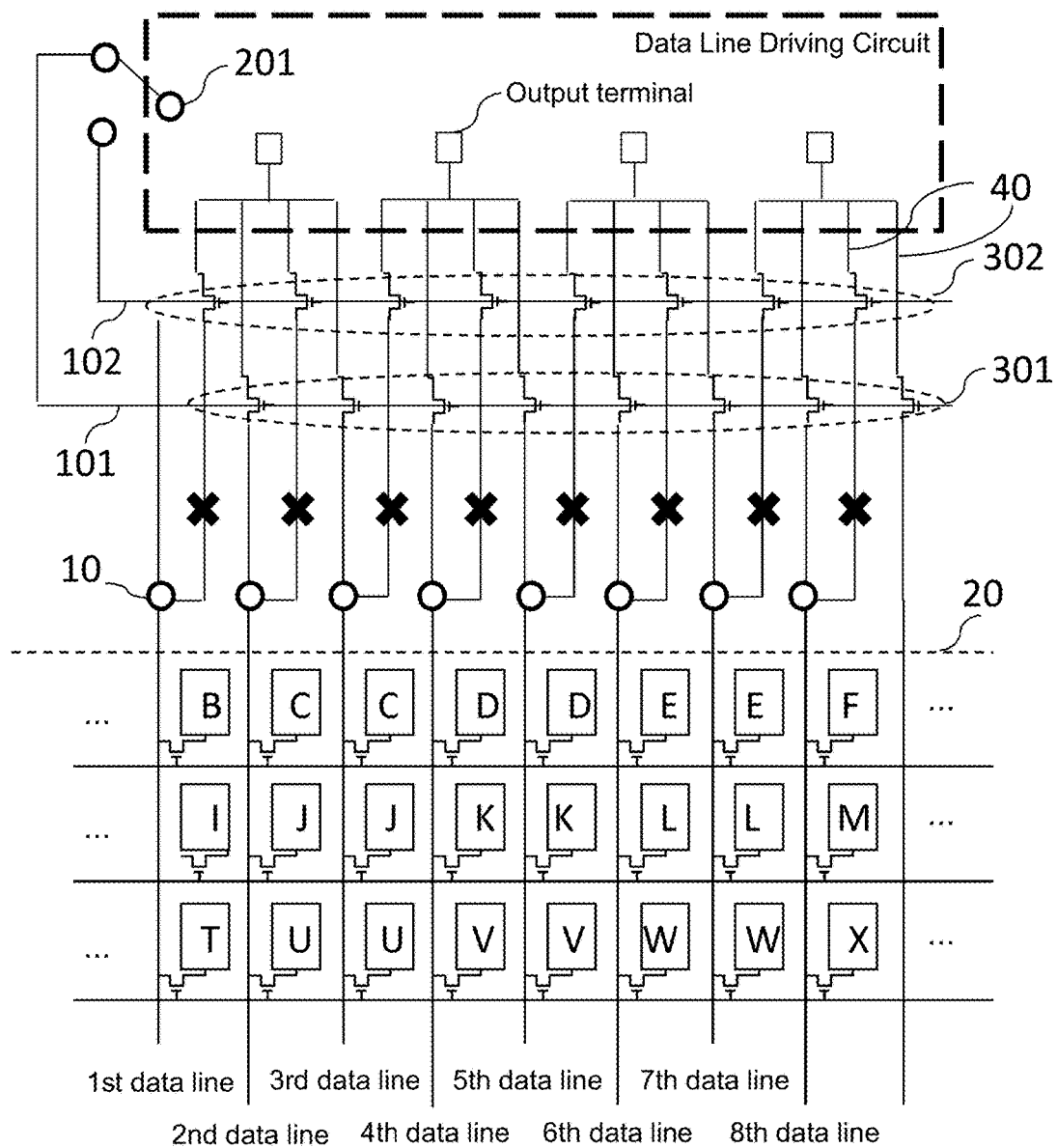
FIGS. 2A and 2B are plan views illustrating a schematic configuration of a connecting configuration according to a first embodiment.

An embodiment of the present disclosure is described below with reference to the accompanying drawings. In one example embodiment, a liquid crystal display device is discussed, but the display device is not limited to the liquid crystal display device. The display device may be, for example, an organic electroluminescence (EL) display device.

FIG. 1 is a plan view illustrating a schematic configuration of a liquid crystal display device 1 according to an exemplary embodiment. The liquid crystal display device includes a display panel, a data line driving circuit, a gate line driving circuit, a timing controller, and a backlight device (not illustrated).

Data lines DL extending in a first direction (for example, a column direction) and gate lines GL extending in a second direction (for example, a row direction) are provided in the display panel. A thin film transistor (TFT) is provided in an intersection of each data line and each gate line. Each data line DL is connected to the data line driving circuit, and each gate line GL is connected to the gate line driving circuit. In the display panel, pixels are arranged in a matrix form (in the row direction and the column direction) according to intersections of data lines DL and gate lines GL. Although not all illustrated, the display panel includes a thin film transistor substrate (TFT substrate), a counter substrate, and a liquid crystal layer that is sandwiched between the TFT and the counter substrates. Pixel electrodes PX are provided in the TFT substrate. Each of the pixel electrodes PX is provided according to each pixel and common electrode. The common electrode is disposed common to each pixel PIX while facing pixel electrodes. The Common electrode may be provided in the counter substrate. Because a color filter is not formed in the counter substrate, the liquid crystal display device displays 1 in monotone.

A data signal (data voltage) is supplied from the data line driving circuit to each data line DL, and a gate signal (gate voltage) is supplied from the gate line driving circuit to each gate line GL. Common voltage is supplied from a common driver (not illustrated) to a common electrode. When an on voltage of the gate signal (gate-on voltage) is supplied to the gate line GL, the TFT connected to gate line GL is turned on to apply the voltage on the data line DL to the pixel electrode PX through the data line DL connected to TFT. An electric field is generated by a difference between the data voltage applied to the pixel electrode PX and the common voltage applied to the common electrode. The liquid crystal is driven by the electric field to control transmittance of the light transmitted from the backlight device, thereby displaying an image. Desired data voltages are supplied to data lines DL connected to pixel electrodes PX of pixels PIX.

The timing controller generates output image data DA for image display and various control signals regulating operation timing in the data line driving circuit and the gate line driving circuit. Specifically, based on the timing signal (clock signal, vertical synchronizing signal, horizontal synchronizing signal) supplied from an external system (not illustrated), the timing controller generates control signals including polarity control signal, data start pulse, data clock, gate start pulse, and gate clock. The timing controller supplies the generated control signals to the data line driving circuit and the gate line driving circuit to control the data line driving circuit and the gate line driving circuit. Specifically, the timing controller supplies polarity, a control signal, a data start pulse, a data clock, and outputs image data to the data line driving circuit. The timing controller also supplies a gate start pulse and a gate clock to the gate line driving circuit.

With reference with FIG. 1, and FIGS. 2A and 2B, a configuration connecting between the data line driving circuit and the data lines DL will be described. In FIG. 1, in the liquid crystal display device 1 according to this embodiment, connecting switches are formed between the data line driving circuit and a top boundary 20 of display portion. The data line driving circuit has output terminals, which output data voltage. Connecting lines are extended from the output terminals to the data lines DL. Between the output terminals and the data lines, connecting switches are formed. The output terminals, the connecting switches, and the data lines are electrically connected through the connecting lines. The connecting switches connect with a selecting switch through a selecting line. The data line driving circuit outputs a selecting signal from the selecting switch to transmit to the selecting line. According to the selecting signal, the connecting switch controls how to connect the output terminals of the data line driving circuit and the data lines DL.

Configurations of the output terminals, the connecting lines, the connecting switches and the connecting points are described in detail with reference to FIGS. 2A and 2B. FIGS. 2A and 2B are schematic plan views illustrating connections between the output terminals of the data line driving circuit and data lines according to the first exemplary embodiment.

Figure 2B:
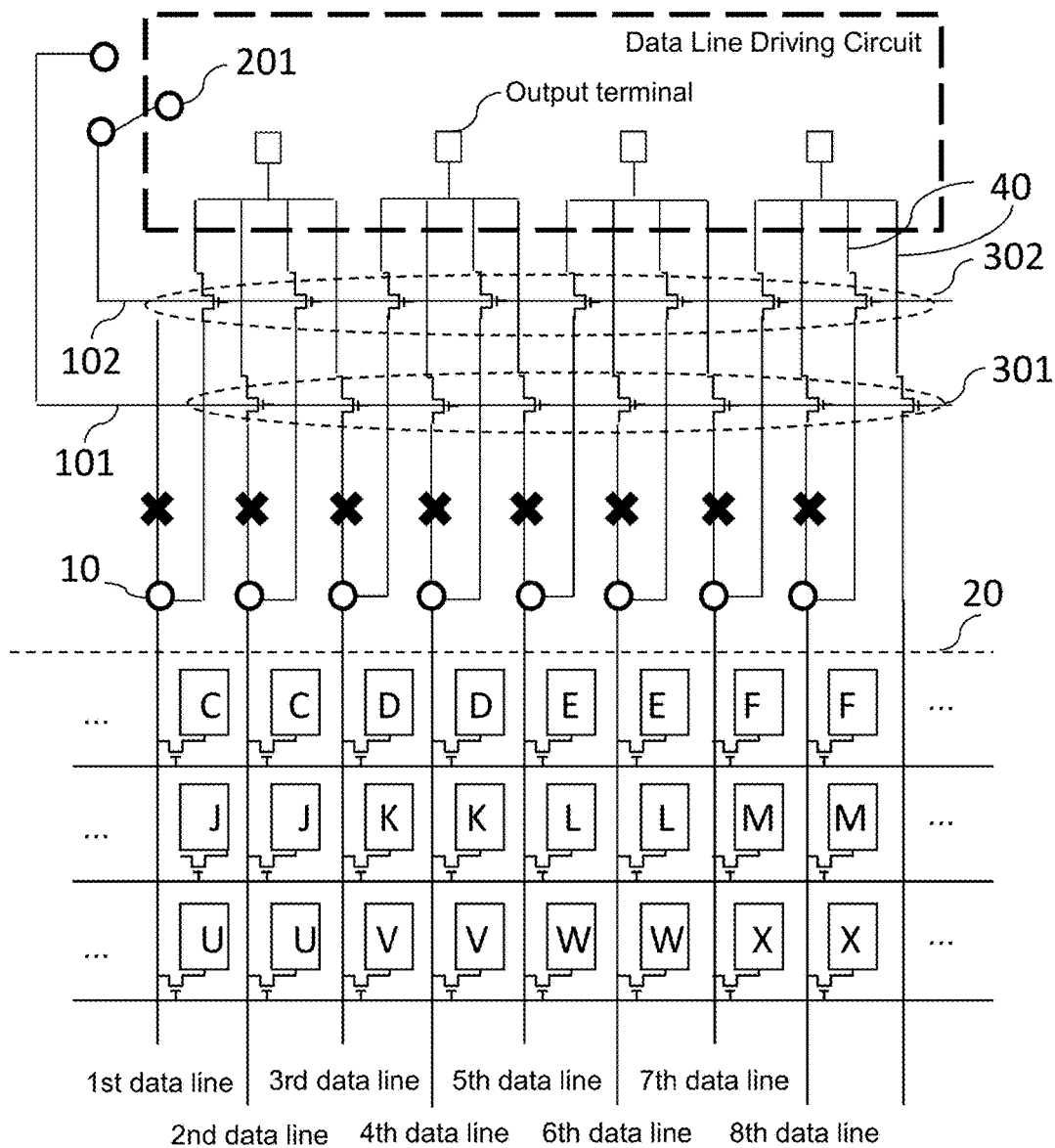

FIG. 2A shows a connection configuration of a first connecting mode and FIG. 2B shows a connection configuration of a second connecting mode. When the first selecting switch selects the first connecting mode, the data line driving circuit transmits a selecting signal 201 to a first selecting line 101. The connecting switches consist of, for example, a group of first selecting TFTs 301 and a group of second selecting TFTs 302. The selecting signal transmitted through the first selecting line 101 turns on the group of first selecting TFTs 301. One output terminal connects with four connecting lines 40. Each connecting line 40 connects one output terminal and one data line DL through one connecting TFTs 301, 302. One output terminal connects with three data lines DL through two of first connecting TFTs 301 and two of second selecting TFTs 302. A connecting configuration between the output terminal and the data lines is changed depending on which group of connecting switches is turned on. 2nd data line and 3rd data line, 4th data line and 5th data line, and 6th data line and 7th data line are connected with each output terminal through the group of first connecting TFTs. When the group of first selecting TFTs is turned on, the same voltage of image data is input to pixel electrodes connecting with the 2nd data line and 3rd data line, the 4th data line and 5th data line, and the 6th data line and 7th data line, respectively.

When the first selecting switch selects the second connecting mode, the data line driving circuit transmits a selecting signal to a second selecting line as shown in FIG. 2B. The 1st data line and 2nd data line, the 3rd data line and 4th data line, the 5th data line and 6th data line, and the 7th data line and 8th data line are connected with each output terminal through the group of second connecting TFTs. When the group of second selecting TFTs is turned on, the same voltage of image data is input to pixel electrodes connecting with the 1st data line and 2nd data line, the 3rd data line and 4th data line, the 5th data line and 6th data line, and the 7th data line and 8th data line, respectively.

In the first connecting mode, a first image is displayed in the display portion as shown in FIG. 2A and a second image is displayed in the display portion as shown in FIG. 2B. The second image is shifted to a left side by a pitch of two adjacent data lines in comparison with the first image. As discussed above, an image displayed in the display portion can be shifted in the row direction by changing the connecting mode with the first selecting switch 201.

With reference with FIG. 1, and FIGS. 3A and 3B, a configuration connecting the gate line driving circuit and the gate lines will be described. In FIG. 1, in the liquid crystal display device 1 according to this embodiment, connecting switches are formed between the gate line driving circuit and a left boundary 21 of the display portion. The gate line driving circuit has output terminals, which output gate signals. Connecting lines are extended from the output terminals of the gate line driving circuit to the gate lines GL. Between the output terminals and the gate line GL, connecting switches are formed, and the connecting switches, the output terminals, and the connecting points are electrically connected through the connecting lines. The connecting switches connect with a second selecting switch through a selecting line. The gate line driving circuit outputs a selecting signal from the second selecting switch. The selecting line transmits the selecting signal to the connecting switches. According to the selecting signal, the connecting switch controls how to connect between the output terminals of the gate line driving circuit and the gate lines.

Figure 3A:
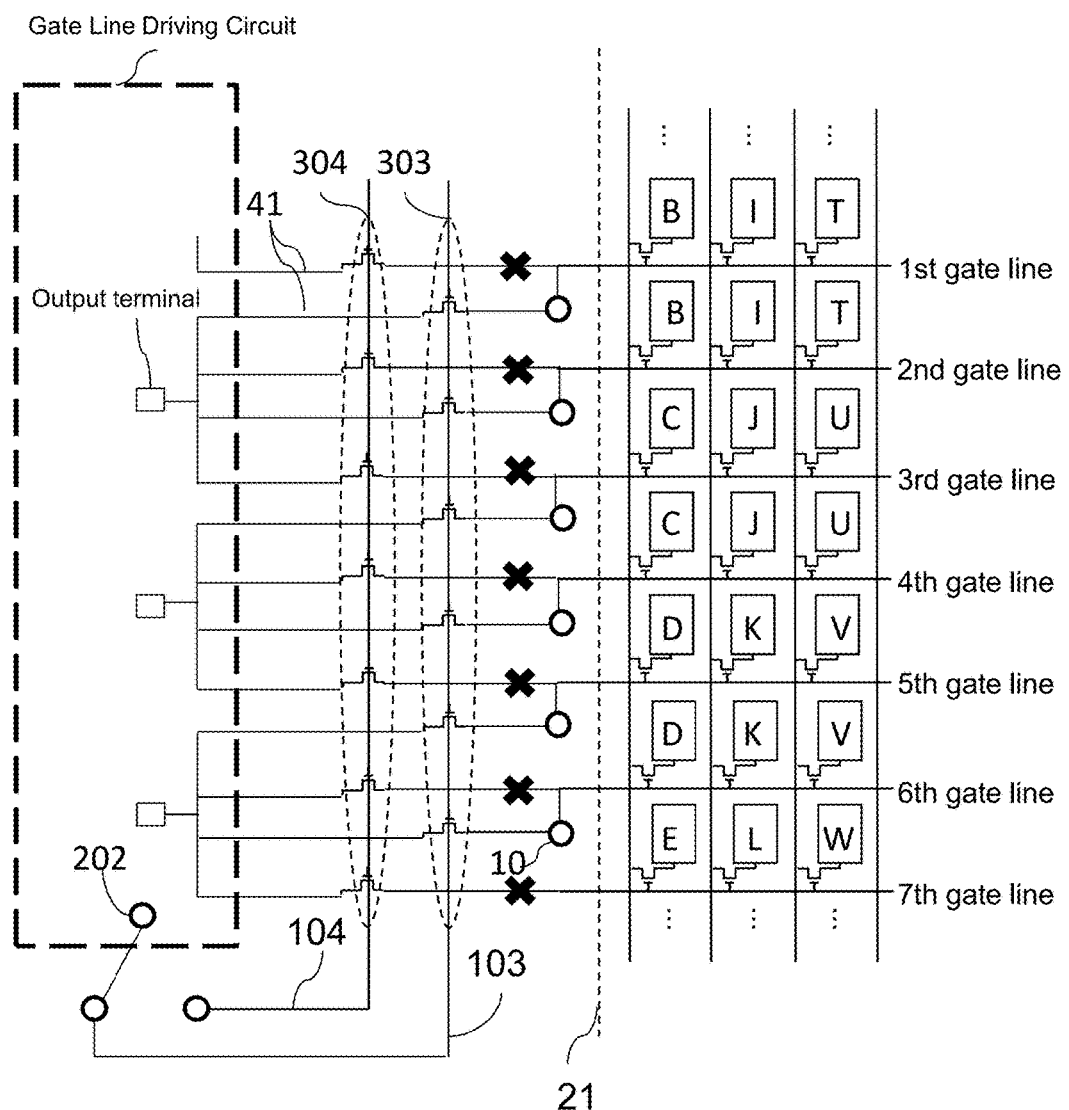
FIGS. 3A and 3B are plan views illustrating a schematic configuration of another connecting configuration according to a first embodiment.
Figure 3B:
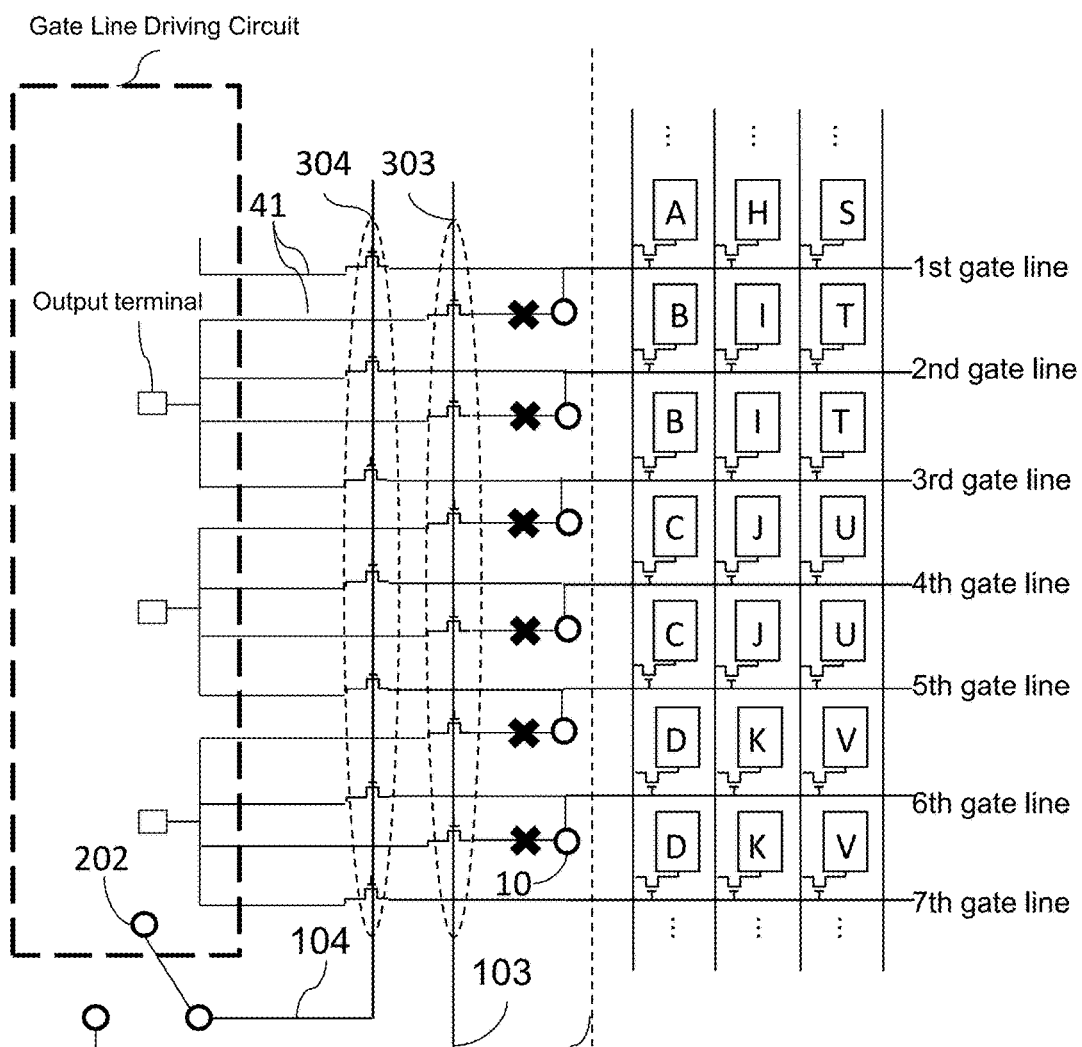

Configurations of the output terminals of the gate line driving circuit, the connecting lines, the connecting switches and the connecting points are described in details with reference to FIGS. 3A and 3B. FIGS. 3A and 3B are schematic plan views illustrating connections between the output terminals of the gate line driving circuit and the gate lines according to the first exemplary embodiment.

FIG. 3A shows a third connecting mode and FIG. 3B shows a fourth connecting mode. When the second selecting switch selects the third connecting mode, the gate line driving circuit transmits a selecting signal to a third selecting line. Connecting switches consist of, for example, a group of third selecting TFTs and a group of fourth selecting TFTs. The selecting signal transmitted through the third selecting line turns on the third group of TFTs. The connecting points are divided into third connecting points and fourth connecting points.

One output terminal connects with four connecting lines 41. Each connecting line 41 connects one output terminal and one gate line GL through one connecting TFTs 303, 304. One output terminal connects with three gate lines GL through two of third connecting TFTs 303 and two of fourth selecting TFTs 304. A connecting configuration between the output terminal and the gate lines is changed depending on which group of connecting switches is turned on. 1st gate line and 2nd gate line, 3rd gate line and 4th gate line, and 5th gate line and 6th gate line are connected with each output terminal through the group of third connecting TFTs 303. When the group of third selecting TFTs 303 is turned on, the same voltage of image data is input to pixel electrodes connecting with the 1st gate line and 2nd gate line, the 3rd gate line and 4th gate line, and the 5th gate line and 6th gate line, respectively.

When the second selecting switch selects the fourth connecting mode, the gate line driving circuit transmits a selecting signal to a fourth selecting line 304 as shown in FIG. 3B. The selecting signal transmitted through the fourth selecting line 304 turns on a group of fourth selecting TFTs 304. 2nd gate line and 3rd gate line, 4th gate line and 5th gate line, and 6th gate line and 7th gate line are connected with each output terminal through the group of fourth connecting TFTs 304. When the group of fourth selecting TFTs 304 is turned on, the same voltage of image data is input to pixel electrodes connecting with the 2nd gate line and 3rd gate line, the 4th gate line and 5th gate line, and the 6th gate line and 7th gate line, respectively.

In the third connecting mode, a third image is displayed in the display portion using the configuration as shown in FIG. 3A and a fourth image is displayed in the display portion using the configuration as shown in FIG. 3B. The fourth image is shifted to down by a pitch of two adjacent gate lines in comparison with the third image. As illustrated above, an image displayed in the display portion can be shifted in the column direction by changing the connecting mode with the second selecting switch.

As above described, according to the first exemplary embodiment, an image displayed in the display portion of the liquid crystal display can be shifted pixel by pixel in both row and column directions.

Second Exemplary Embodiment

A second exemplary embodiment of the present disclosure will be described below with reference to the drawings. For convenience, the components having the same functions as those of the first exemplary embodiment are designated by the same reference marks, and their description is omitted.

In the first exemplary embodiment, one output terminal of the data line driving circuit connects with three data lines, while in the second exemplary embodiment, one output terminal of the data line driving circuit connects with five data lines.

Figure 4A:
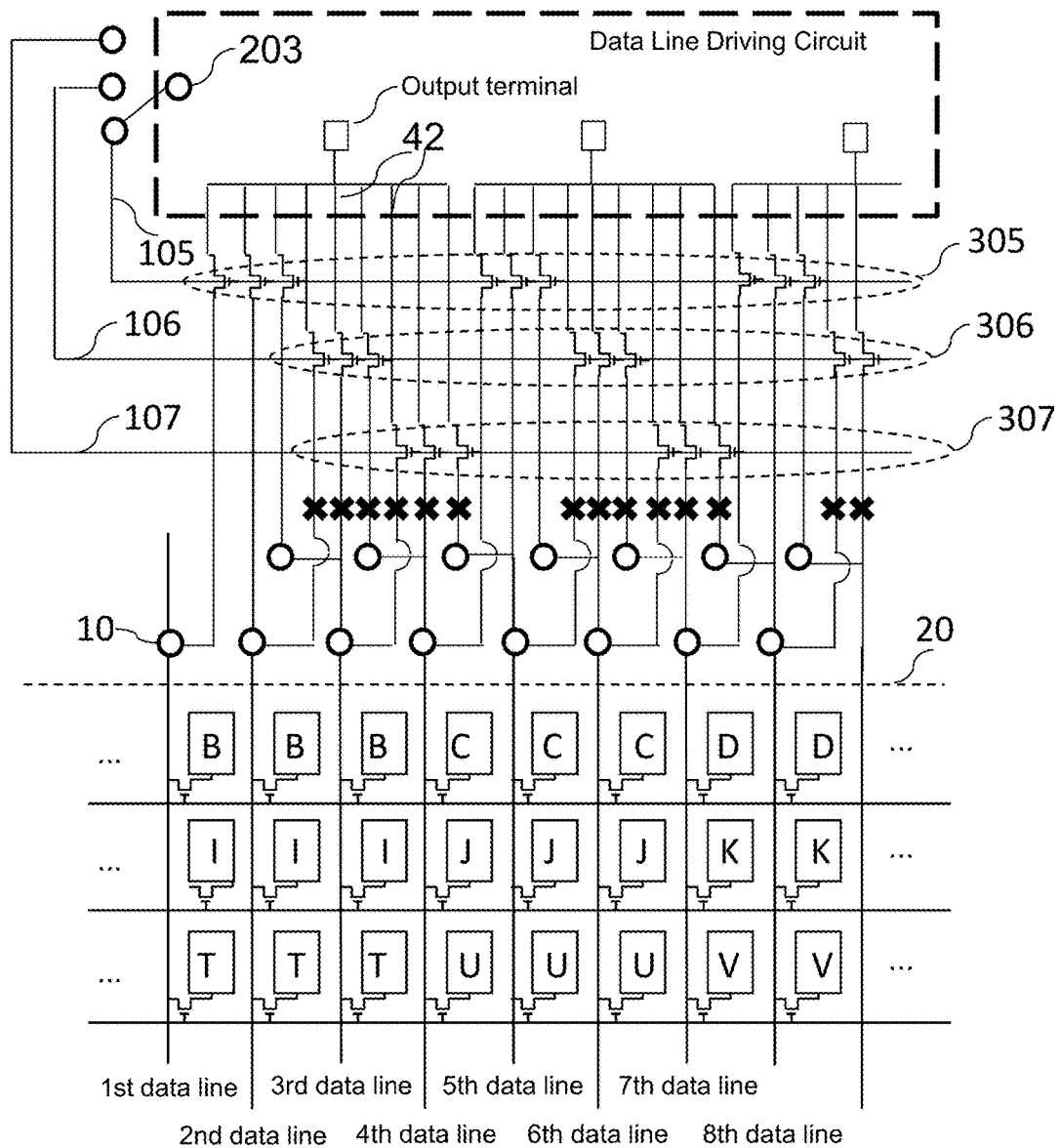
FIGS. 4A, 4B and 4C are plan views illustrating a schematic configuration of another connecting configuration according to a second embodiment.
Figure 4B:
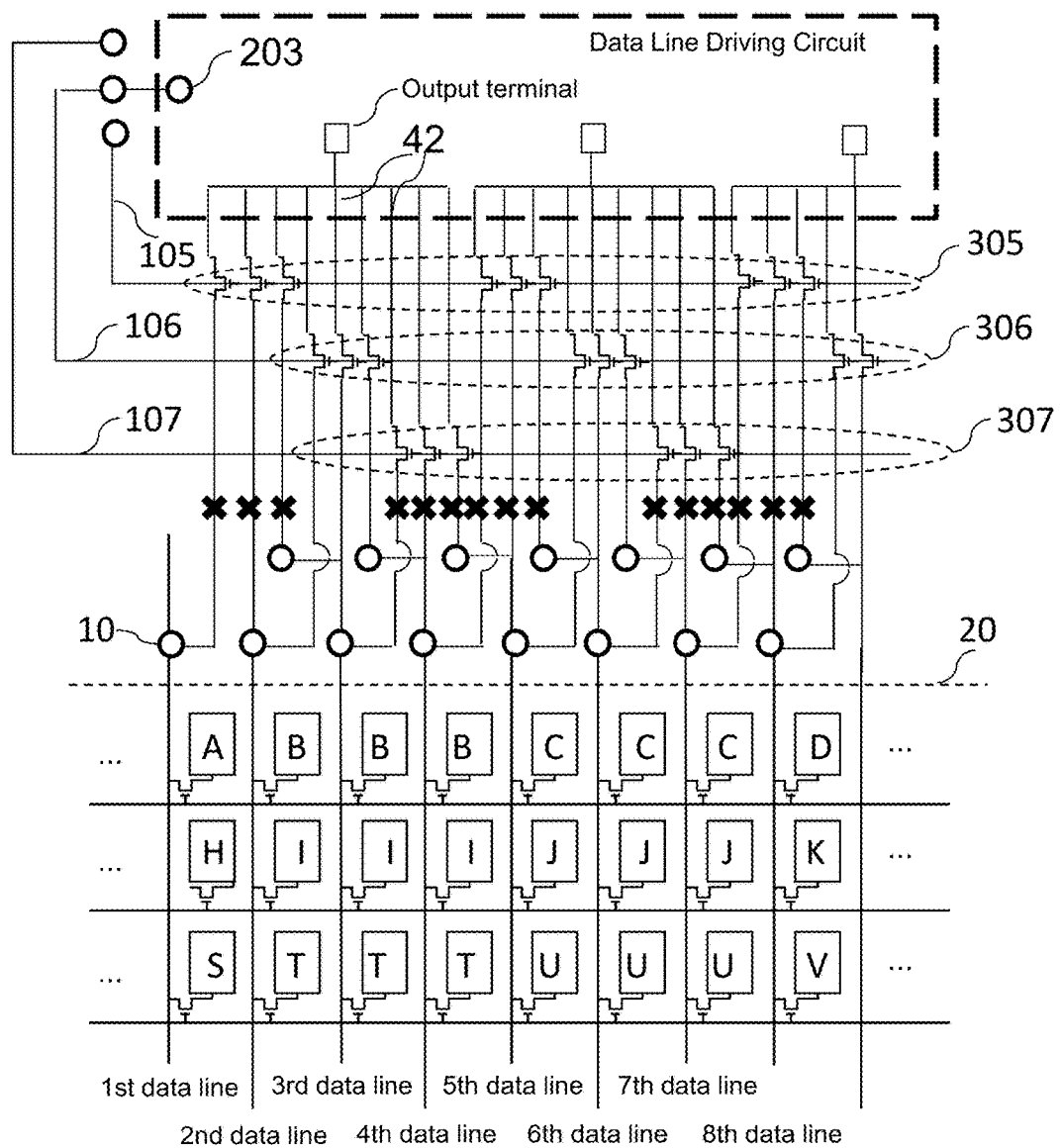
Figure 4C:
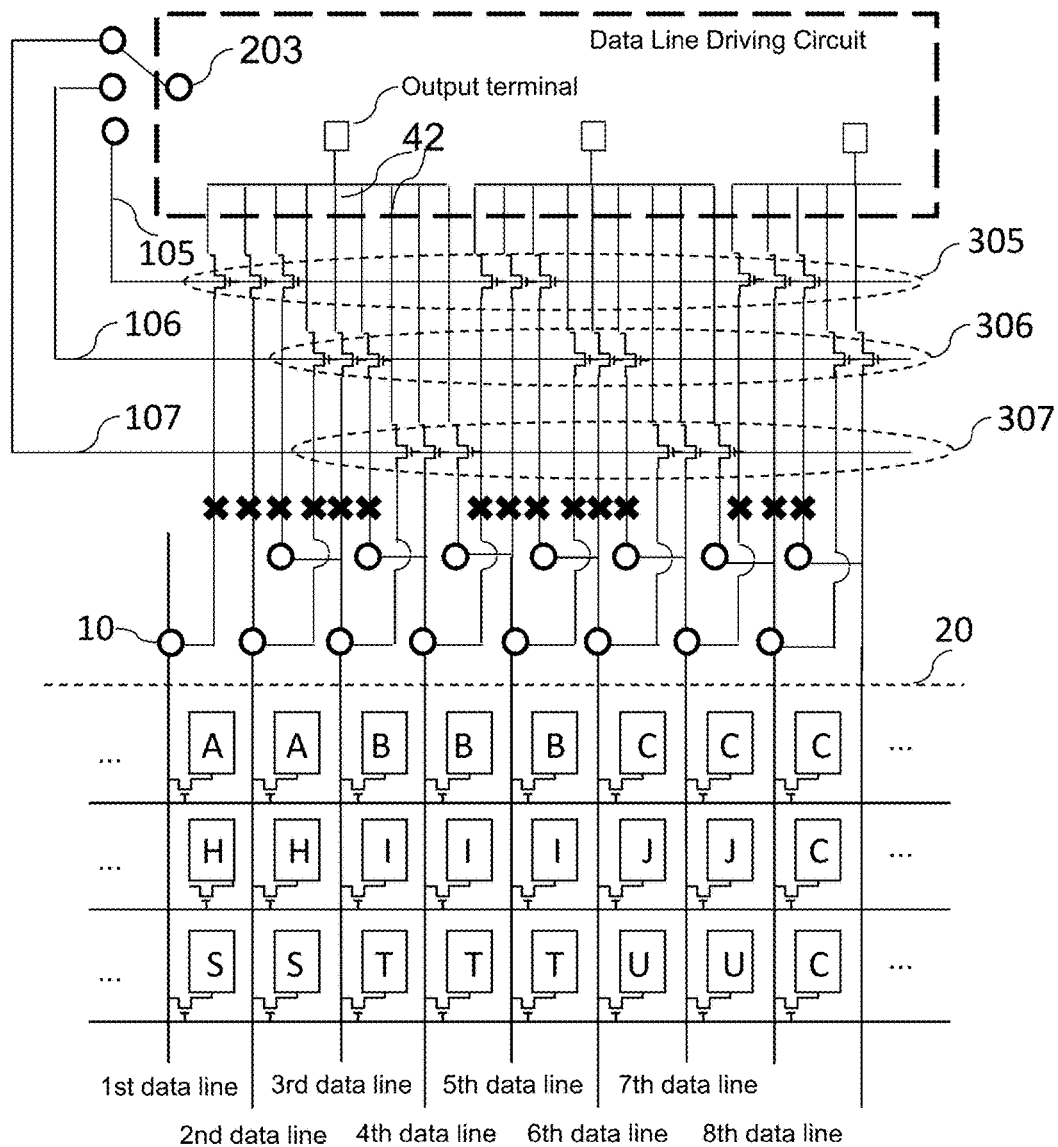

FIGS. 4A, 4B and 4C are schematic plan views illustrating connection between output terminals of the data line driving circuit and data lines according to the second exemplary embodiment.

FIG. 4A shows a fifth connecting mode, FIG. 4B shows a sixth connecting mode, and FIG. 4C shows a seventh connecting mode.

The connecting switches consists of, for example, a group of fifth selecting TFTs, a group of sixth selecting TFTs, and a group of seventh selecting TFTs. One output terminal connects with nine connecting lines 42. Each connecting line 42 connects one output terminal and one data line DL through one connecting TFTs 305, 306, 307. One output terminal connects with five data lines DL through three of fifth connecting TFTs 305, three of sixth selecting TFTs 306 and three of seventh selecting TFTs 307. A connecting configuration between the output terminal and the data lines is changed depending on which group of connecting switches is turned on.

When a third selecting switch 203 selects the fifth connecting mode as shown in FIG. 4A, the data line driving circuit transmits a selecting signal to a fifth selecting line 105 to turn on the group of fifth selecting TFTs 305. 1st data line, 2nd data line and 3rd data line, 4th data line, 5th data line and 6th data line are connected with each output terminal through the group of fifth connecting TFTs. When the group of fifth selecting TFTs is turned on, the same voltage of image data is input to pixel electrodes connecting with the 1st data line, 2nd data line and 3rd data line, the 4th data line, 5th data line and 6th data line, respectively.

When the third selecting switch 203 selects the sixth connecting mode as shown in FIG. 4B, the data line driving circuit transmits a selecting signal to a sixth selecting line 106 to turn on the group of sixth selecting TFTs 306. 2nd data line, 3rd data line and 4th data line, 5th data line, 6th data line and 7th data line are connected with each output terminal through the group of sixth connecting TFTs 306. When the group of sixth selecting TFTs 106 is turned on, the same voltage of image data is input to pixel electrodes connecting with the 2nd data line, 3rd data line and 4th data line, the 5th data line, 6th data line and 7th data line, respectively.

When the third selecting switch 203 selects the seventh connecting mode as shown in FIG. 4C, the data line driving circuit transmits a selecting signal to a seventh selecting line 107 to turn on the group of seventh selecting TFTs 307. 3rd data line, 4th data line and 5th data line, 6th data line, 7th data line and 8th data line are connected with each output terminal through the group of seventh connecting TFTs 307.

When the group of seventh selecting TFTs 107 is turned on, the same voltage of image data is input to pixel electrodes connecting with the 3rd data line, 4th data line and 5th data line, the 6th data line, 7th data line and 8th data line, respectively.

In the fifth connecting mode, a fifth image is displayed in the display portion using the configuration as shown in FIG. 4A. In the sixth connecting mode, a sixth image is displayed in the display portion using the configuration as shown in FIG. 4B. In the seventh connecting mode, a seventh image is displayed in the display portion using the configuration as shown in FIG. 4C. The sixth image is shifted right by one adjacent data lines in comparison with the fifth image. The seventh image is shifted right by two adjacent data lines in comparison with the fifth image.

In the liquid crystal display 1 according to the second exemplary embodiment, an image displayed in the display portion can be operated to make a larger shift than the liquid crystal display according to the first exemplary embodiment. And in the liquid crystal display according to the first exemplary embodiment, two pixels display the same image, while in the liquid crystal display according to the second exemplary embodiment, three pixels display the same image. When one pixel is defective in the liquid crystal display according to the first exemplary embodiment, another one pixel can show an image which the defective pixel is supposed to display. This can suppress deterioration of the image quality when a defective pixel is present. When one pixel is defective in the liquid crystal display according to the second exemplary embodiment, the other two pixels show an image which the defective pixel is supposed to display, which can further suppress deterioration of the image quality when a defective pixel is present.

In the second exemplary embodiment, the connection between output terminals of the data line driving circuit and the data lines is described. As described in the first exemplary embodiment, this configuration can be applied to a configuration of a connection between one output terminal and three gate lines. And in the first exemplary embodiment, one output terminal is connected with two lines, while in the second exemplary embodiment, one output terminal is connected with three lines. The number of lines connected with one output terminal of a driving circuit is not limited to thereto. Four or more lines can connect with one output terminal of the driving circuit.

Third Exemplary Embodiment

A third exemplary embodiment of the present disclosure will be described below with reference to the drawings. For convenience, the components having the same functions as those of the first exemplary embodiment are designated by the same reference marks, and their description is omitted.

In the third exemplary embodiment, one example of an application of the liquid crystal display according to the first or second exemplary embodiment will be described.

Figure 5:
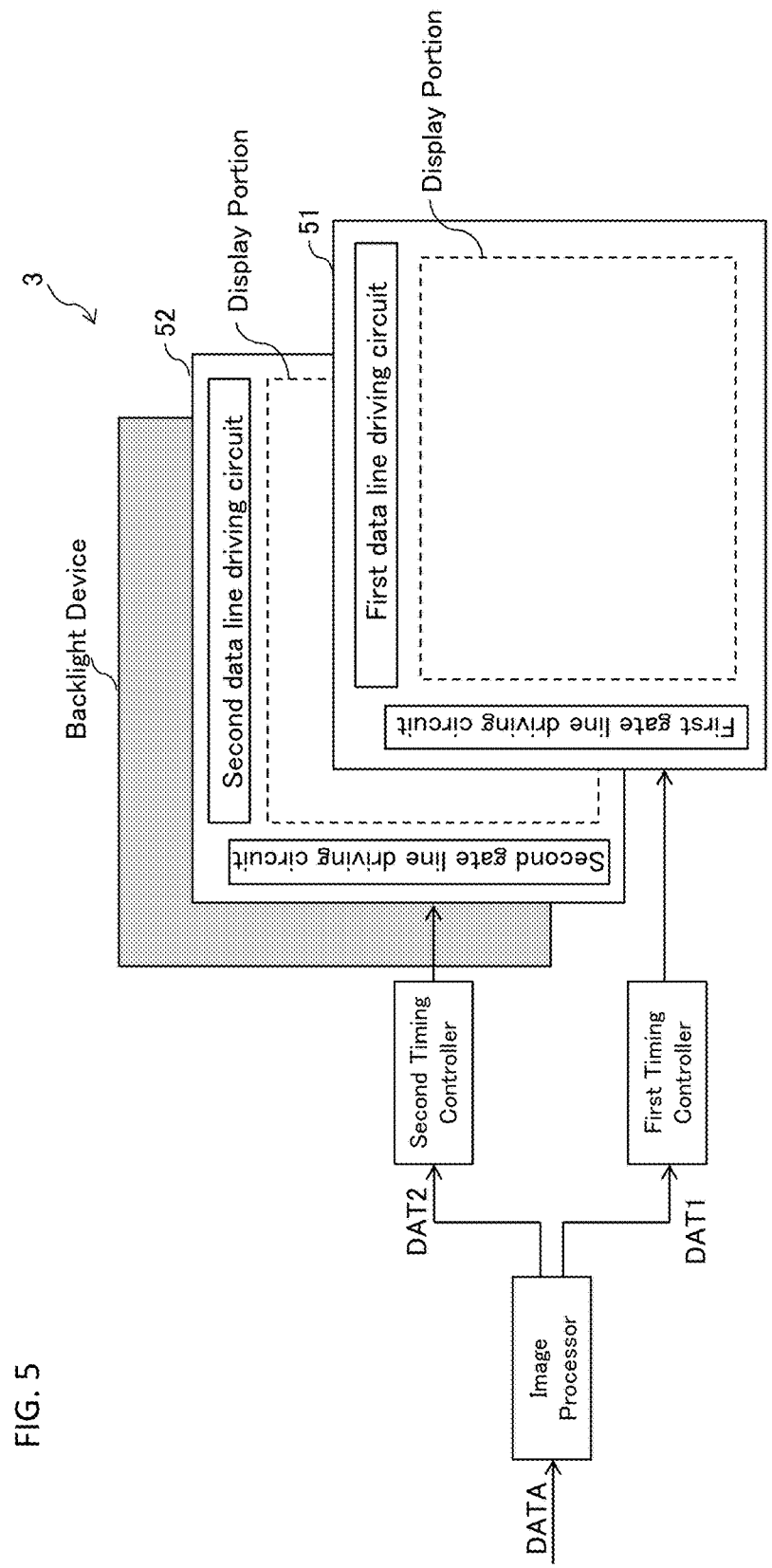
FIG. 5 is an explanatory illustration showing a structure of an image display device according to the third exemplary embodiment.

FIG. 5 is an explanatory illustration showing a structure of an image display device 3 according to the third exemplary embodiment. The image display device includes an image processor which receives external input image data DATA and converts the external input image data to signals corresponding to each liquid crystal display element. A display unit (assembly) includes a plurality of stacked liquid crystal display elements (first and second liquid crystal display elements 51, 52 in FIG. 5). As the display modes of the first and second liquid crystal display elements 51, 52, it is possible to combine and employ various kinds of modes such as IPS (In Plane Switching) mode, TN (Twisted Nematic) mode, and VA (Vertical Alignment) mode as appropriate.

The image processor executes signal conversion (image processing) on the external input image data DATA, and transmits image data for driving each of the liquid crystal display elements 51, 52 arranged in each of the liquid crystal display elements. First and second timing controllers output various timing signals to the display unit (first and second liquid crystal display elements 51,52) in order to control the timing to output the signals to the display unit to have the images displayed on each of the liquid crystal display elements synchronized with each other.

The display unit includes a first and a second liquid crystal display element 51, 52, and a backlight device. The first liquid crystal display element 51 is structured as a liquid crystal display element for a color display, and the second liquid crystal display element 52 is structured as a liquid crystal display element for a monochrome display.

Each of the liquid crystal driving circuits drives the first and second liquid crystal display elements 51, 52 based on the signals received from the image processor via the first and second timing controllers. The backlight device radiates light to the first and second liquid crystal display elements 51, 52 from the back-face side thereof.

The light emitted from the backlight device is modulated based on the drive signals inputted to the second liquid crystal display element 52 when passing through the second liquid crystal display element 52, and then is incident on the first liquid crystal display element 51. In the first liquid crystal display element 51, the displayed image is controlled based on the inputted drive signals. A viewer observes the displayed image by observing the light transmitted through the first and second liquid crystal display elements 51, 52. Because the image display device has such structures, the image display device can display a high contrast image.

Figure 6:
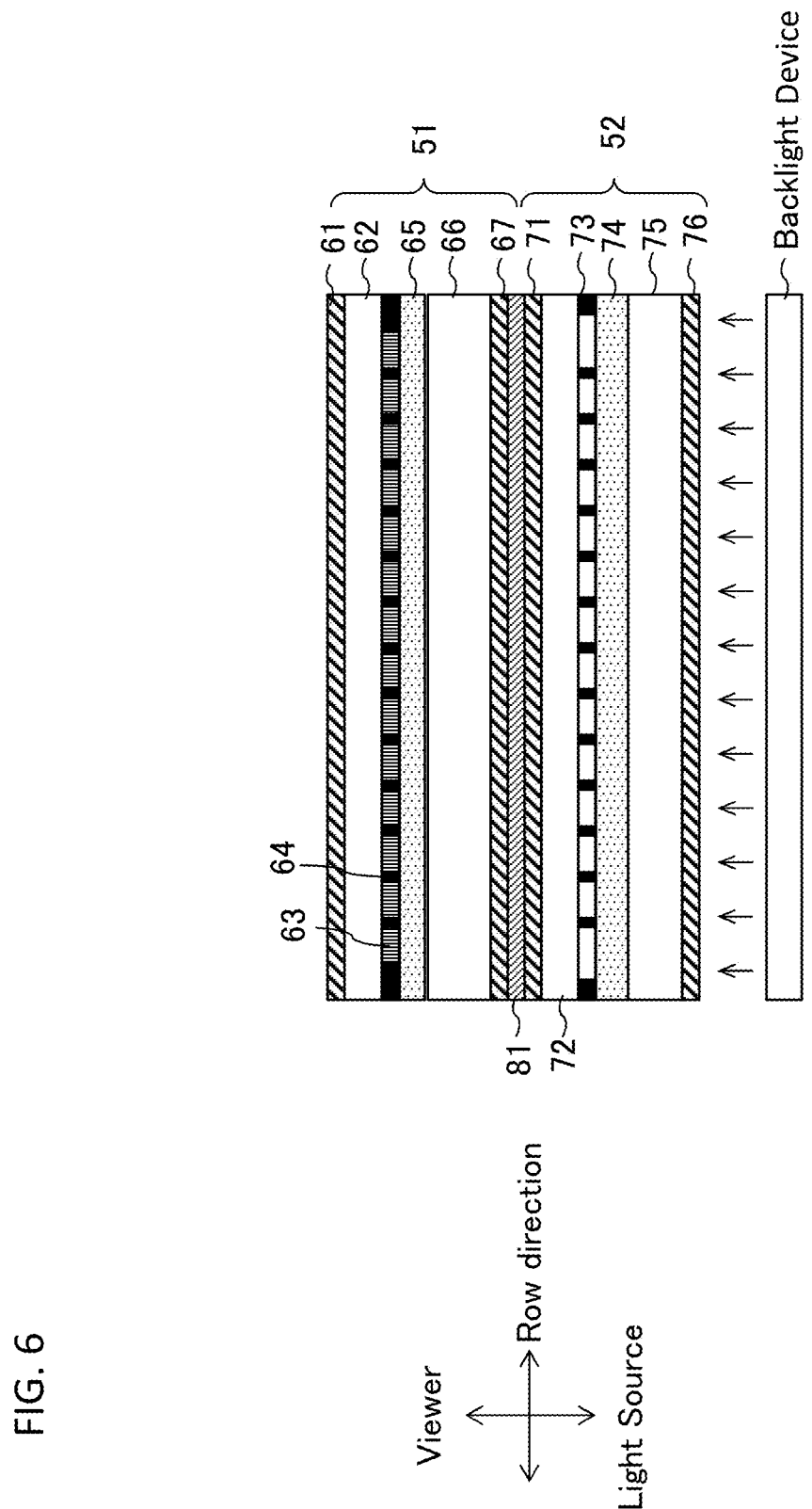
FIG. 6 is an explanatory illustration showing a sectional structure of a display unit shown in FIG. 5.

FIG. 6 is an explanatory illustration showing a sectional structure of the liquid crystal display element part of the image display device 3 shown in FIG. 5. In the first liquid crystal display element 51, a polarization plate 61, a transparent substrate 62, a color filter layer 63 and a black matrix 64, a liquid crystal layer 65, a transparent substrate 66, and a polarization plate 67 are disposed in order from the light emission side. In the second liquid crystal display element 52 on a backlight device side, a polarization plate 71, a transparent substrate 72, a black matrix 73, a liquid crystal layer 74, a transparent substrate 75, and a polarization plate 76 are disposed in order from the light emission side.

A light diffusion layer 81 may be disposed between the first liquid crystal display element 51 and the second liquid crystal display element 52. When the second liquid crystal display element 52 that executes the image processing is located at the far side from the viewer side, the light diffusion layer (e.g., a diffusion film), having the light diffusing characteristic provided between the first liquid crystal display element 51 and the second liquid crystal display element 52, can provide an effect of reducing moire fringes and interference fringes generated when the wirings and BM (black matrixes) of the stacked liquid crystal display elements interfere with each other. Therefore, it is possible to provide more preferable images to the viewer.

Figure 7A:
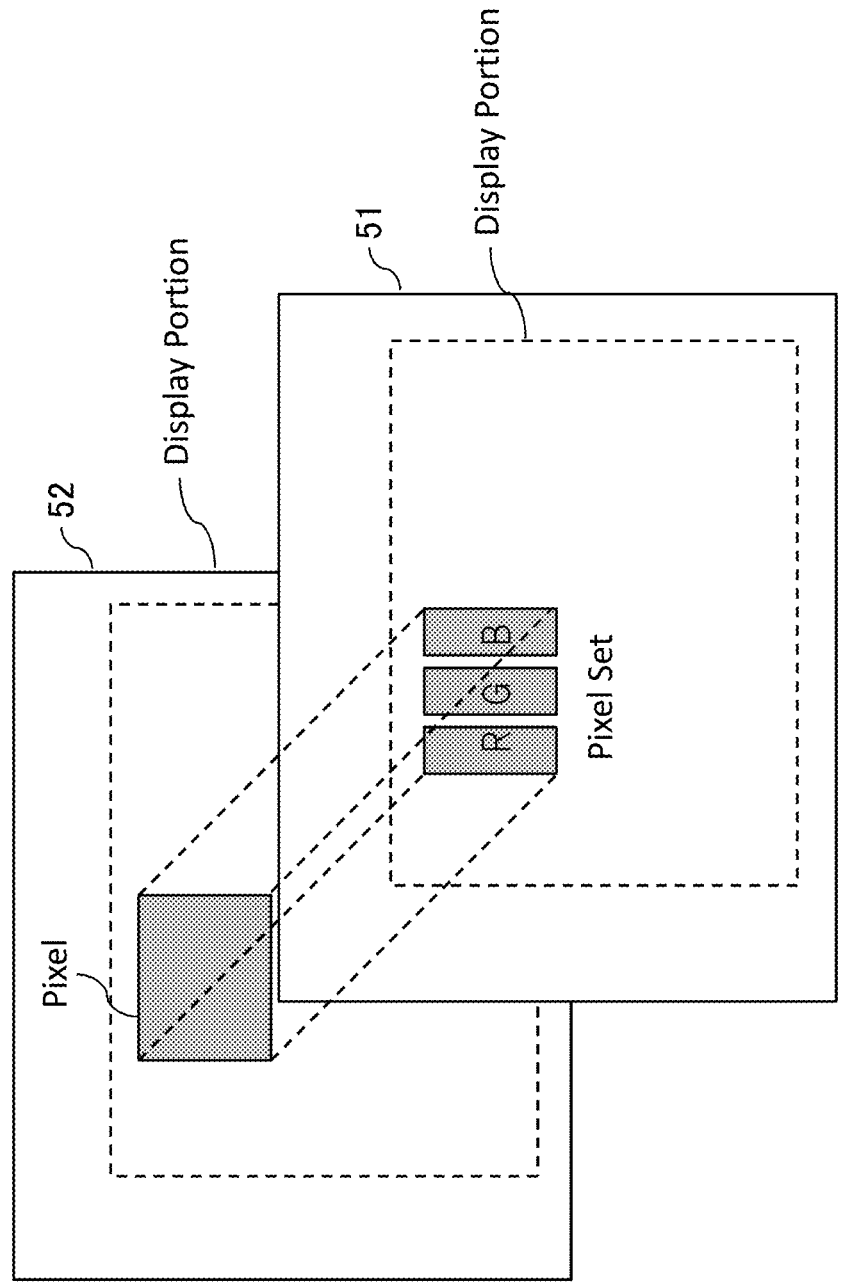
FIGS. 7A, 7B and 7C are schematic views for illustrating an application of the first or second exemplary embodiments.
Figure 7B:
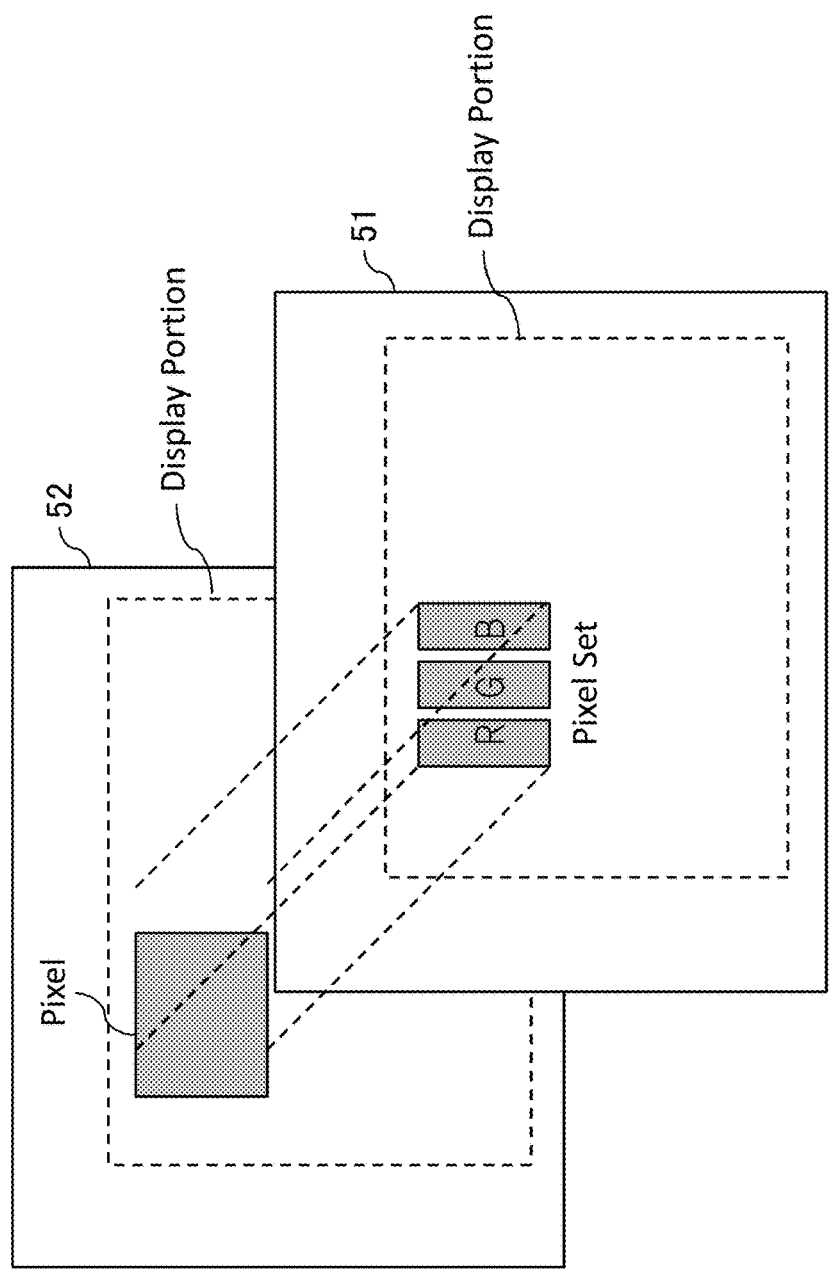
Figure 7C:
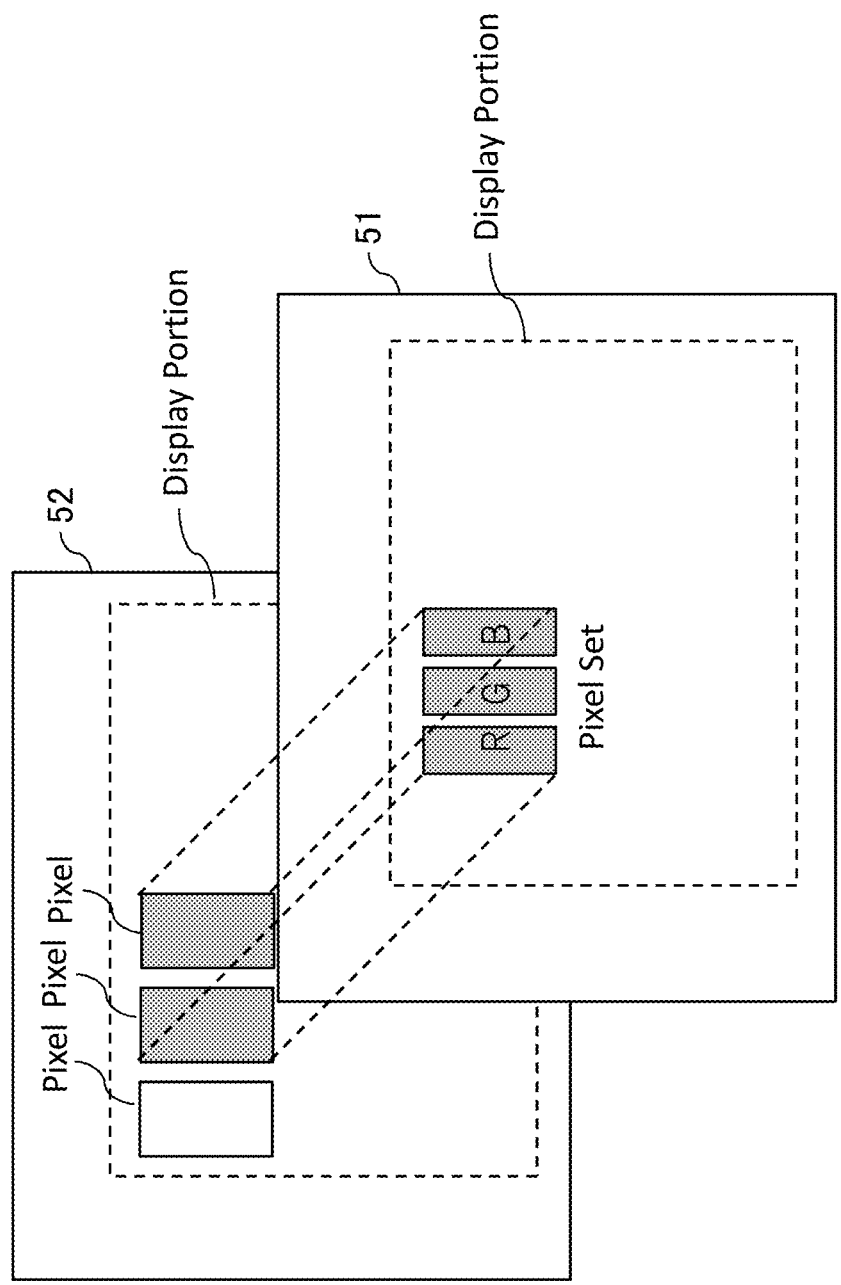

The liquid crystal display device according to the first or second exemplary embodiment can be applied to the second liquid crystal display element 52 in the third exemplary embodiment. FIGS. 7A, 7B and 7C are schematic views for illustrating an application of the first or second exemplary embodiments.

Because the first liquid crystal display element 51 displays color, a plurality of color pixels such as red, green and blue pixels are formed therein. Because the second liquid crystal display element 52 displays monotone, non-color pixels are formed therein. In a normal image display component, red, green and blue pixels in the first liquid crystal display element 51 correspond to one pixel in the second liquid crystal display element 52 as shown in FIG. 7A. In a manufacturing process of the image display component, there is a step of stacking the first liquid crystal display element 51 and the second liquid crystal display element 52. The off-set occurs between these two liquid crystal display elements 51, as shown in FIG. 7B. In this case, the liquid crystal display device according to the first or second exemplary embodiment has advantages. One pixel in the second liquid crystal display element is divided into two or more pixels. Images displayed in these two liquid crystal display device are adjusted by changing connecting modes as shown in FIG. 7C.

Figure 8B:
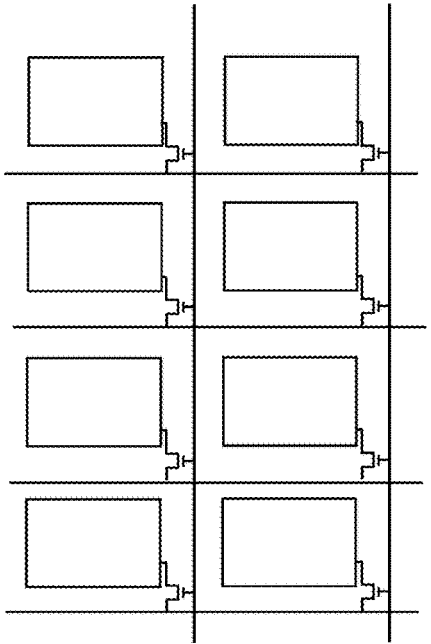
FIGS. 8B, 8C and 8D are schematic plan views for illustrating examples of pixels in the second liquid crystal display element according to the third exemplary embodiment.
Figure 8D:
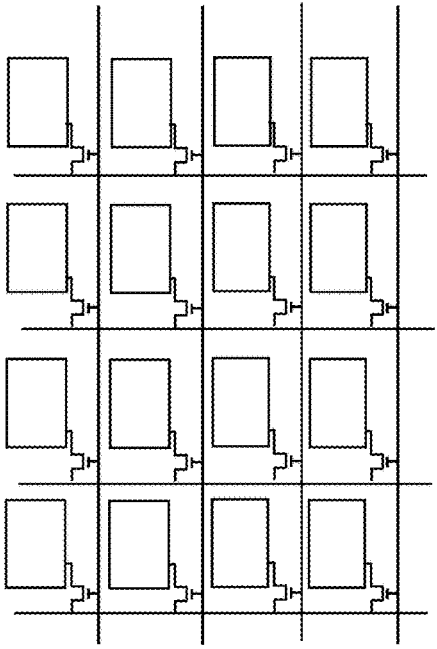
Figure 8A:
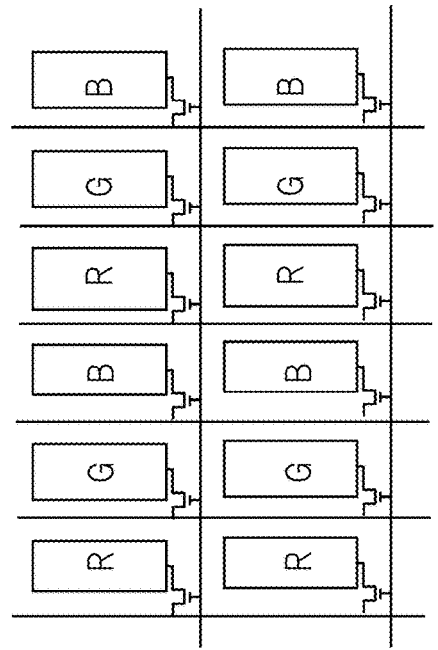
FIG. 8A is a schematic plan view of pixels in a first liquid crystal display element according to the third exemplary embodiment.
Figure 8C:
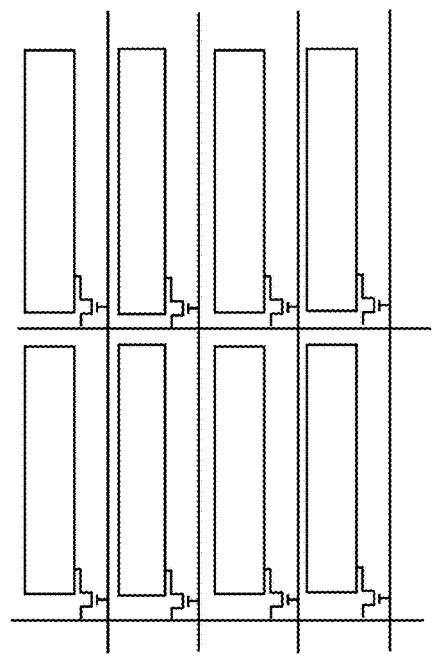

FIG. 8A is a schematic plan view of pixels in the first liquid crystal display element 51. FIGS. 8B, 8C and 8D are schematic plan views for illustrating examples of pixels in the second liquid crystal display element 52. A pixel set comprising a Red pixel, a Green pixel and a Blue pixel is arranged in a matrix in the first liquid crystal display element 51 shown in FIG. 8A. A size of the pixel set in the first liquid crystal display element 51 corresponds to two pixels in the second liquid crystal display element 52 as shown in FIGS. 8B and 8C. A pixel pitch is the same between FIG. 8A and FIG. 8B in an extended direction of the data line. A pixel pitch in FIG. 8C is the same as three pixel pitches in an extended direction of the gate line. A size of the pixel set in the first liquid crystal display element 51 corresponds to four pixels in the second liquid crystal display element 52 as shown in FIG. 8D.

Although exemplary embodiments of the present disclosure are described above, the present disclosure is not limited to these exemplary embodiments. It is noted that other embodiments properly changed from the exemplary embodiments described above by those skilled in the art without departing from the scope of the present disclosure are fully supported by the present disclosure.

What is claimed is:
1. A display device comprising:
a plurality of driving circuits;
a plurality of terminals formed in each of the plurality of driving circuits;
a plurality of signal lines connected to the plurality of terminals;
a plurality of pixel electrodes, each of the plurality of pixel electrodes connected to each of the plurality of signal lines; and
a switch configured to change a connection mode between the plurality of terminals and the plurality of signal lines, wherein
the plurality of signal lines includes a first line, a second line, a third line, a fourth line, and a fifth line arrayed in this order,
the plurality of terminals includes a first terminal and a second terminal next to the first terminal,
the switch, configured to change from a first connection mode to a second connection mode, the first terminal connecting the first line and the second line in the first connection mode, and the first terminal connecting the second line and the third line in the second connection mode, in the first connection mode, the second terminal connects the third line and the fourth line, and in the second connection mode, the second terminal connects and the fourth line and the fifth line, and the plurality of driving circuits are data line driving circuits, and the plurality of signal lines are data lines.

2. The display device of claim 1, wherein
the plurality of signal lines further includes a fourth line and a sixth line, the sixth line, the first line, the second line, the third line, and the fourth line arrayed in this order, wherein the first switch is configured to change connection modes amongst the first connection mode, the second connection mode, or a third connection mode, in the first connection mode, the first terminal further connects the sixth line, in the second connection mode, the first terminal further connects the fourth line, and in the third connection mode, the first terminal connects the first line, the second line and the third line.

3. The display device of claim 2, wherein
the plurality of signal lines further includes a fifth line, a seventh line and an eighth line, the sixth line, the first line, the second line, the third line, the fourth line, the fifth line, the seventh line, and the eighth line, arrayed in this order, the plurality of terminals further includes a second terminal next to the first terminal, in the first connection mode, the second terminal connects the third line, the fourth line and the fifth line, in the second connection mode, the second terminal connects the fifth line, the seventh line and the eighth line, and in the third connection mode, the second terminal connects the fourth line, the fifth line and the seventh line.

4. The display device of claim 1, further comprising a plurality of thin film transistors (TFT), wherein
the plurality of TFTs includes a first TFT and a second TFT, the first and second TFTs being arranged in parallel to one another and having their respective drain lines being commonly connected at the first terminal, in the first connection mode, the first TFT is turned on and the second TFT is turned off, and in the second connection mode, the second TFT is turned on and the first TFT is turned off.

5. The display device of claim 1, further comprising a plurality of thin film transistors (TFT), wherein
the first terminal connects three lines through four TFTs, and in the first connection mode, two TFTs from the four TFTs are turned on and the other two TFTs from the four TFTs are turned off, in the second connection mode, the other two TFTs are turned on and the two TFTs are turned off.

6. The display device of claim 1, further comprising a plurality of thin film transistors (TFT), wherein
the first terminal connects five lines through nine TFTs, and in both of the first and second connection mode, three TFTs from the nine TFTs are turned on and the other six TFTs from the nine TFTs are turned off.

7. The display device of claim 6, further comprising a plurality of selecting lines, wherein
the plurality of selecting lines includes a first selecting line and a second selecting line, the first selecting line connects to first gate electrodes of the first TFT and the third TFT, and the second selecting line connects to second gate electrodes of the second TFT and the fourth TFT, in the first connection mode, the first gate electrodes are input on-voltage through the first selecting line and the second gate electrodes are input off-voltage through the first selecting line, in the second connection mode, the second gate electrodes are input on-voltage through the first selecting line and the first gate electrodes are input off-voltage through the second selecting line.

8. The display device of 1, further comprising a plurality of thin film transistors (TFT), wherein
the first terminal connects three lines through four TFTs, and in the first connection mode, two TFTs from the four TFTs are turned on and the other two TFTs from the four TFTs are turned off, and in the second connection mode, the other two TFTs are turned on and the two TFTs are turned off.

9. A display device comprising:
a plurality of driving circuits;
a plurality of terminals formed in each of the plurality of driving circuits;
a plurality of signal lines connected to the plurality of terminals;
a plurality of pixel electrodes, each of the plurality of pixel electrodes connected to each of the plurality of signal lines; and
a switch configured to change a connection mode between the plurality of terminals and the plurality of signal lines, wherein
the plurality of signal lines includes a first line, a second line and a third line arrayed in this order,
the plurality of terminals includes a first terminal,
the switch, configured to change from a first connection mode to a second connection mode, the first terminal connecting the first line and the second line in the first connection mode, and the first terminal connecting the second line and the third line in the second connection mode,
the plurality of driving circuits are gate line driving circuits, and
the plurality of signal lines are gate lines.

10. The display device of claim 9, wherein
the plurality of signal lines further includes a fourth line and a fifth line, the first line, the second line, the third line, the fourth line, and the fifth line being arrayed in this order,
the plurality of terminals further includes a second terminal next to the first terminal,
wherein in the first connection mode, the second terminal connects the third line and the fourth line, and
in the second connection mode, the second terminal connects and the fourth line and the fifth line.

11. The display device of claim 10, wherein
the plurality of signal lines further includes a fourth line and a sixth line, the sixth line, the first line, the second line, the third line, and the fourth line arrayed in this order,
wherein the first switch is configured to change connection modes amongst the first connection mode, the second connection mode, or a third connection mode,
in the first connection mode, the first terminal further connects the sixth line, in the second connection mode, the first terminal further connects the fourth line, and in the third connection mode, the first terminal connects the first line, the second line and the third line.

12. The display device of claim 11, wherein
the plurality of signal lines further includes a fifth line, a seventh line and an eighth line, the sixth line, the first line, the second line, the third line, the fourth line, the fifth line, the seventh line, and the eighth line, arrayed in this order,
the plurality of terminals further includes a second terminal next to the first terminal, in the first connection mode, the second terminal connects the third line, the fourth line and the fifth line,
in the second connection mode, the second terminal connects the fifth line, the seventh line and the eighth line, and
in the third connection mode, the second terminal connects the fourth line, the fifth line and the seventh line.

13. The display device of 9, further comprising a plurality of thin film transistors (TFT), wherein
the plurality of TFTs includes a first TFT and a second TFT,
the first and second TFTs being arranged in parallel to one another and having their respective drain lines being commonly connected at the first terminal, and
in the first connection mode, the first TFT is turned on and the second TFT is turned off, and in the second connection mode, the second TFT is turned on and the second TFT is turned off.

14. The display device of 9, further comprising a plurality of thin film transistors (TFT), wherein
the first terminal connects five lines through nine TFTs, and
in both of the first and second connection mode, three TFTs from the nine TFTs are turned on and the other six TFTs from the nine TFTs are turned off.

15. The display device of 14, further comprising a plurality of selecting lines, wherein
the plurality of selecting lines includes a first selecting line and a second selecting line, the first selecting line connects to first gate electrodes of the first TFT and the third TFT, and the second selecting line connects to second gate electrodes of the second TFT and the fourth TFT,
in the first connection mode, the first gate electrodes are input on-voltage through the first selecting line and the second gate electrodes are input off-voltage through the first selecting line, in the second connection mode, the second gate electrodes are input on-voltage through the first selecting line and the first gate electrodes are input off-voltage through the second selecting line.

16. The display device of claim 9 further comprising:
a display portion configured to display an image, wherein
a plurality of pixel electrodes are arranged in a matrix in the display portion,
a first image is displayed in the display portion in the first connection mode, and a second image is displayed in the display portion in the second connection mode, and
the first image is shifted from the second image by a pitch of two adjacent signal lines from the plurality of signal lines.

17. A display device comprising:
a plurality of driving circuits;
a plurality of terminals formed in each of the plurality of driving circuits;
a plurality of signal lines connected to the plurality of terminals;
a plurality of pixel electrodes, each of the plurality of pixel electrodes connected to each of the plurality of signal lines;
a switch configured to change a connection mode between the plurality of terminals and the plurality of signal lines; and
a display portion configured to display an image, wherein
the plurality of signal lines includes a first line, a second line and a third line arrayed in this order,
the plurality of terminals includes a first terminal,
the switch, configured to change from a first connection mode to a second connection mode, the first terminal connecting the first line and the second line in the first connection mode, and the first terminal connecting the second line and the third line in the second connection mode,
a plurality of pixel electrodes are arranged in a matrix in the display portion,
a first image is displayed in the display portion in the first connection mode, and a second image is displayed in the display portion in the second connection mode, and
the first image is shifted from the second image by a pitch of two adjacent signal lines from the plurality of signal lines.

18. The display device of claim 17, wherein
the plurality of driving circuits are data line driving circuits, and
the plurality of signal lines are data lines.

* * * * *